United States Patent [19]

Thomas et al.

[11] 4,034,194
[45] July 5, 1977

[54] METHOD AND APPARATUS FOR TESTING DATA PROCESSING MACHINES

[75] Inventors: David E. Thomas; Marion B. McCoy; Michael J. Chaky, all of Seaford, Del.

[73] Assignee: NCR Corporation, Dayton, Ohio

[22] Filed: Feb. 13, 1976

[21] Appl. No.: 658,135

[52] U.S. Cl. .................. 235/153 AC; 364/900
[51] Int. Cl.² ..................................... G06F 11/04
[58] Field of Search ............ 235/153 AC, 153 AK, 235/153 AM; 324/73 R, 73 AT; 340/172.5

[56] References Cited

UNITED STATES PATENTS

| | | | |
|---|---|---|---|
| 3,813,531 | 5/1974 | King et al. | 235/153 AK |
| 3,831,148 | 8/1974 | Greenwald et al. | 235/153 AC |
| 3,870,953 | 3/1975 | Boatman et al. | 324/73 R |
| 3,909,802 | 9/1975 | Cassarino, Jr. et al. | 235/153 AK |
| 3,924,109 | 12/1975 | Jhu et al. | 235/153 AC |
| 3,931,506 | 1/1976 | Borrelli et al. | 235/153 AC |
| 3,939,453 | 2/1976 | Schroeder | 235/153 AC |
| 3,967,103 | 6/1976 | Cachuela et al. | 235/153 AC |

*Primary Examiner*—Charles E. Atkinson
*Attorney, Agent, or Firm*—J. T. Cavender; Wilbert Hawk, Jr.; Richard W. Lavin

[57] ABSTRACT

A method and apparatus for testing a business machine of the type having a keyboard for entering data into the machine and includes means for storing the entered data. The method and test apparatus are directed to carrying out diagnostic routines on the business machine for determining the defective area of the machine. After the test apparatus is attached to the business machine, the data stored in the machine is transferred and stored in the test apparatus. A programmed control sequence of diagnostic routines is then carried out by the test apparatus with each routine terminating in the operation of an indicator member located on the test apparatus indicating whether a fault exists in the portion of the machine being tested. A control key on the test apparatus allows the operator to initiate a new diagnostic routine. At the completion of the diagnostic routines, the data stored in the test apparatus is transferred back to the business machine. To insure that the data originally stored in the machine was not altered or lost in the test operation, the business machine is operated prior to and after the operation of the test apparatus to print out on a pair of record members the data stored in the machine. The printed data on the record members is compared to determine the validity of the data now stored in the business machine.

6 Claims, 5 Drawing Figures

METHOD AND APPARATUS FOR TESTING DATA PROCESSING MACHINES

BACKGROUND OF THE INVENTION

Modern day business machines include data terminals and Electronic Cash Registers (ECR) in which data in the form of binary bits is stored in memory units such as Random Access memory (RAM) members and which utilize a central processing unit (CPU) for controlling the various functions of the machine. The CPU can be constructed with a computing capacity as to be capable of performing diagnostic routines on the ECR whenever a breakdown of the machine occurs during its operation. But in order to provide this capacity, the cost of the CPU is high thus limiting their use in only the more expensive ECR's. In those ECR's which are designed to be of low cost construction, the CPU is selected by necessity to be of low cost but still capable of controlling the various operations of the ECR for which it was designed. This has resulted in the use of a CPU which does not have the capacity to store and carry out the test routines of the more expensive CPU. To overcome this problem, plugable Read Only Memory (ROM) members have been used to provide the additional diagnostic routines needed for the testing of the ECR. While this method solved the diagnostic portion of test programs, the data storage area in the CPU could not be tested because of the limited storage capacity of the low cost CPU. In addition, it was found to be desirable if the operator could observe the results of each test routine so as to eliminate further testing of the machine once the defect has been discovered.

SUMMARY OF THE INVENTION

In accordance with the present invention, there is provided a test apparatus which includes a program storage device and data storage devices. In carrying out a test of the electronic cash register, the operator will first operate the ECR to print out on a record member the data stored in the ECR. The test apparatus is then attached to the ECR. A control member on the ECR is then operated which results in the transferring of the data in the ECR to the storage devices in the test apparatus. A plurality of test routines are then initiated under the control of the program control device in the test apparatus. At the completion of each test routine, means on the test apparatus will indicate the result of the test routine on the ECR. The operator then actuates a key member on the test apparatus to initiate the next test routine. At the completion of the testing program, the data stored in the test apparatus is transferred back to the ECR. The ECR is again operated to print out on a second record member the data transferred from the test apparatus. The printed data on the two record members are then compared to verify that the data now stored in the ECR is the same as was originally stored in the ECR prior to the start of the test operation. It is therefore an object of the present invention to provide a method of applying a diagnostic routine to a business machine or other type of data processing apparatus. It is another object of the present invention to provide a method and apparatus for testing electronic cash registers including that portion of the register which stores the data generated by the operation of the register. It is a further object of this invention to provide an apparatus for testing an electronic cash register wherein the operator can control the type of diagnostic routine that is applied to the register. It is another object of this invention to provide a test apparatus for applying a plurality of diagnostic routines to an electronic cash register which is simple in its operation and low in cost.

These and other objects of the present invention will become more apparent and better understood when taken in conjunction with the following description and drawings, which drawings form a part of the present specification, and wherein like characters indicate like parts.

DESCRIPTION OF THE PREFERRED EMBODIMENT

Figure 1:
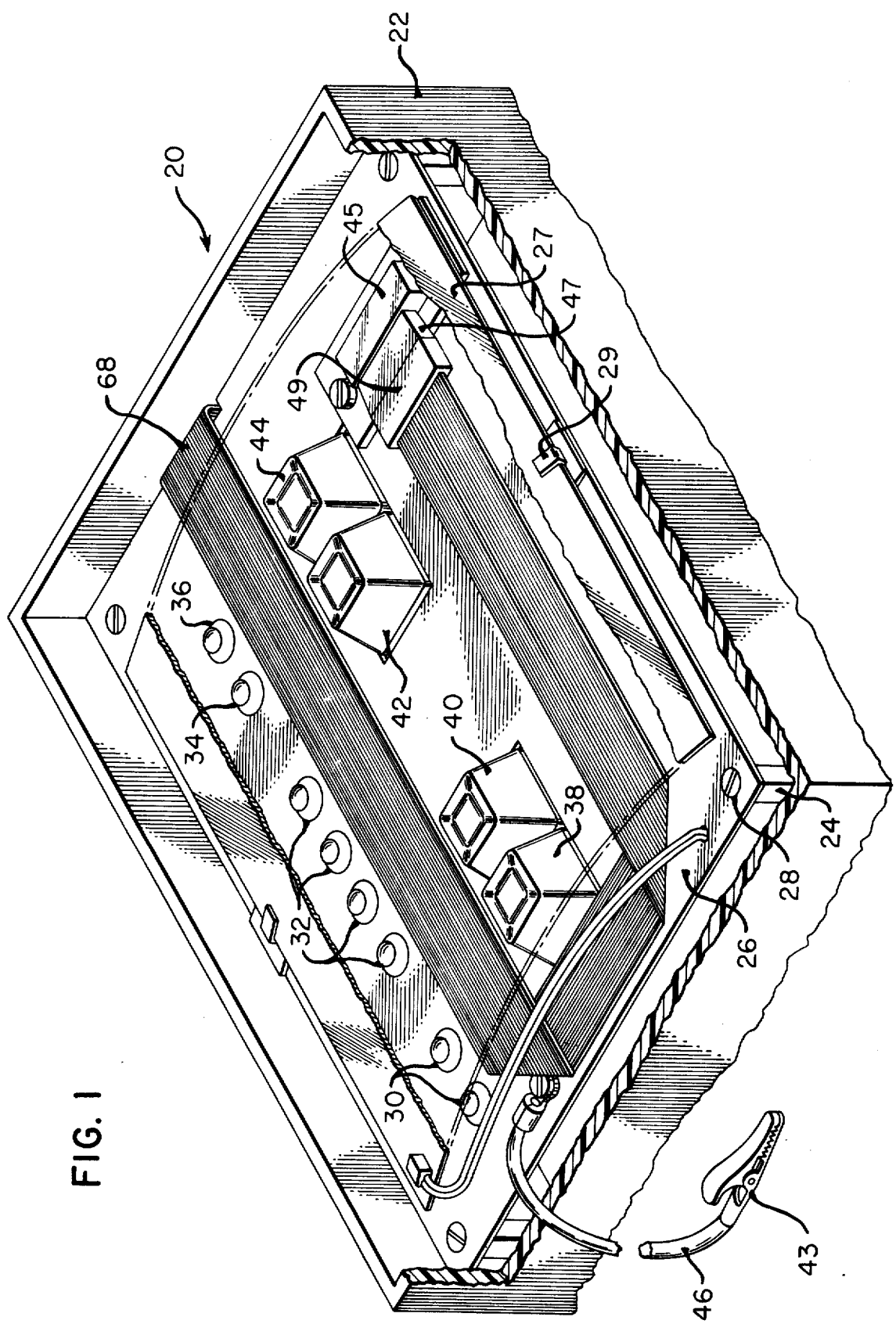
FIG. 1 is an oblique view of the test apparatus portions of the apparatus removed showing details of its construction.

Referring to FIG. 1 of the drawing, there is shown an oblique view of the test apparatus utilized in testing an electronic cash register (ECR) or other type of data processing apparatus. The test apparatus generally indicated by the numeral 20 includes a box-like body member 22 having a support portion 24 in each corner supporting a front panel member 26 secured to the support portion 24 by any conventional fastener means such as screws 28. Mounted within the body member 22 are program and data storage devices (not shown) which will be described more fully hereinafter. A cover member 27 removably mounted to the panel member 26 by means of anchor members 29 is provided when the test apparatus is not in use.

Mounted in the panel member 26 are a plurality of indicator lamps 30, 32 which indicate in binary form the test routine number that is being applied to the ECR. The two lamps 30 indicate the tens portion of the binary member while the four lamps 32 indicate the units portion of the binary number. While there has been disclosed the use of lamps 30, 32 to indicate in binary form the number of the test routine being applied to the ECR, it is obvious that other types of indicator lamps may be used such as LED type numerical display to display the test routine number. Also included in the panel member 26 is a Test Completion lamp 34 and a Power On Lamp 36.

Depressibly mounted in the panel member 26 are a plurality of key members which include a Reload Key member 38 for transferring data from the test apparatus 20 to the ECR under test, a Dpexer key member 40 for by-passing certain test routines performed by the test apparatus, a YES key member 42 for controlling the test apparatus to initiate a new test routine, and a NO key member 44 for controlling the test apparatus to repeat a test routine. Also secured to the panel member 26 is a ground strap 46 terminating in a clip 43 for attaching to the ECR and a multi-conductor cable 48 for attaching to the ECR which is to be tested. The cable 48 terminates in a male connector 49 having a portion 47 which is replaceable when worn out. The connector 49 is stored in a storage receptacle 45 when not in use.

Figure 2:
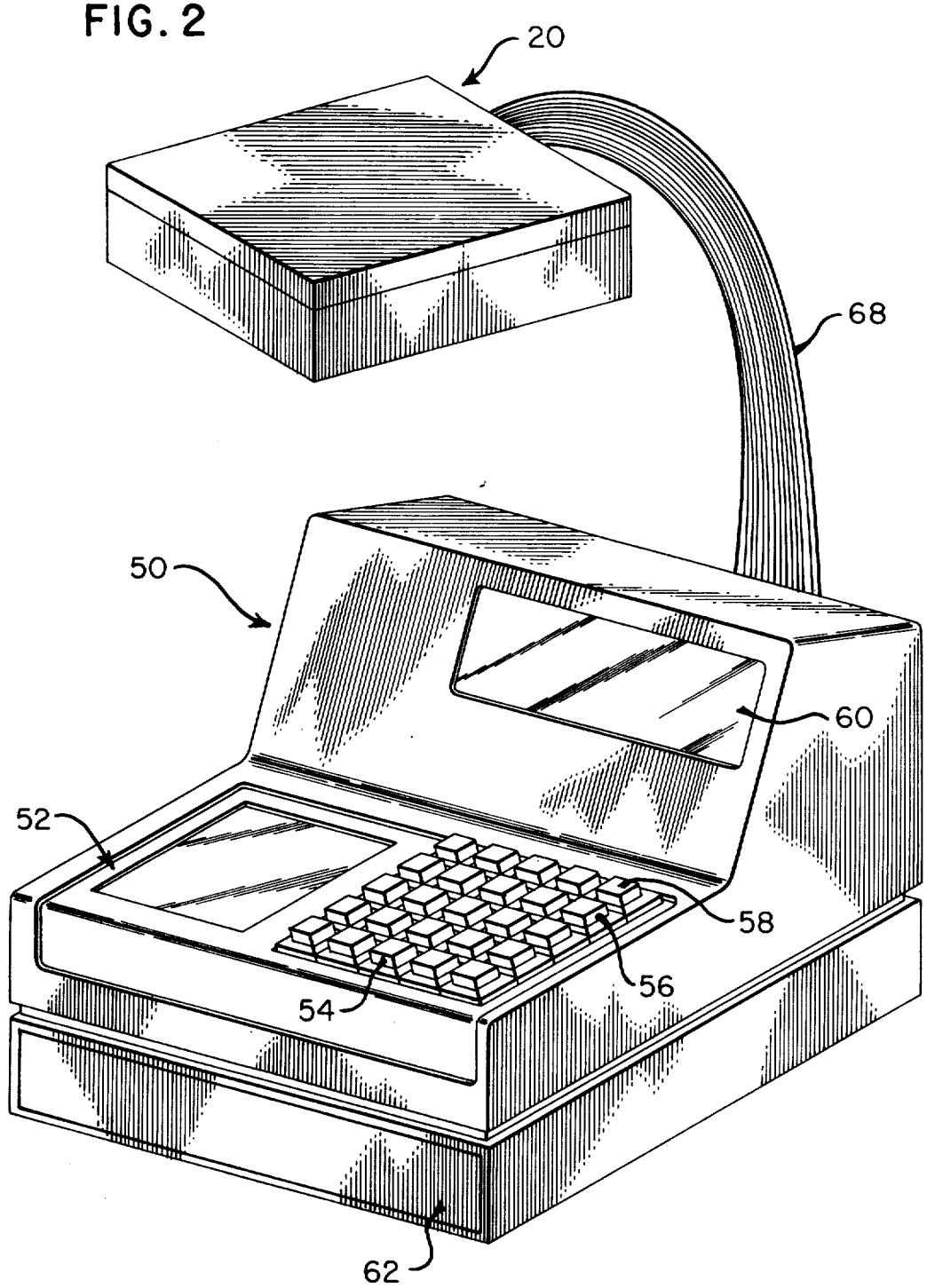
FIG. 2 is a pictorial view of the test apparatus attached to the electronic cash register.

As shown more clearly in FIG. 2, the cable 48 may be attached to the rear of an ECR or other type of data processing device generally indicated by the numeral 50. The ECR 50 is of well known construction and includes a keyboard 52 having a plurality of control keys which include keys 54 forming of ten key portion for entering data into a storage area of the register and control keys 56 for identifying the data stored in the register and for controlling various types of register operations such as item and total operation. As is well known in the art, the keyboard includes a Read Control key 58 which will operate the ECR to print on a record member the data that is stored in the ECR, the record member being made available to the operator after the print operation. Reference should be made to the Class 22 Service Manual, copyrighted 1959 by The National Cash Register Company for a complete disclosure of the functional operation of the keyboard 52. In addition to the keyboard 52, the ECR 50 includes a display panel 60 for displaying information concerning the operation of the ECR and a cash drawer 62 for storing currency received as part of a merchandise transaction.

Figure 3:
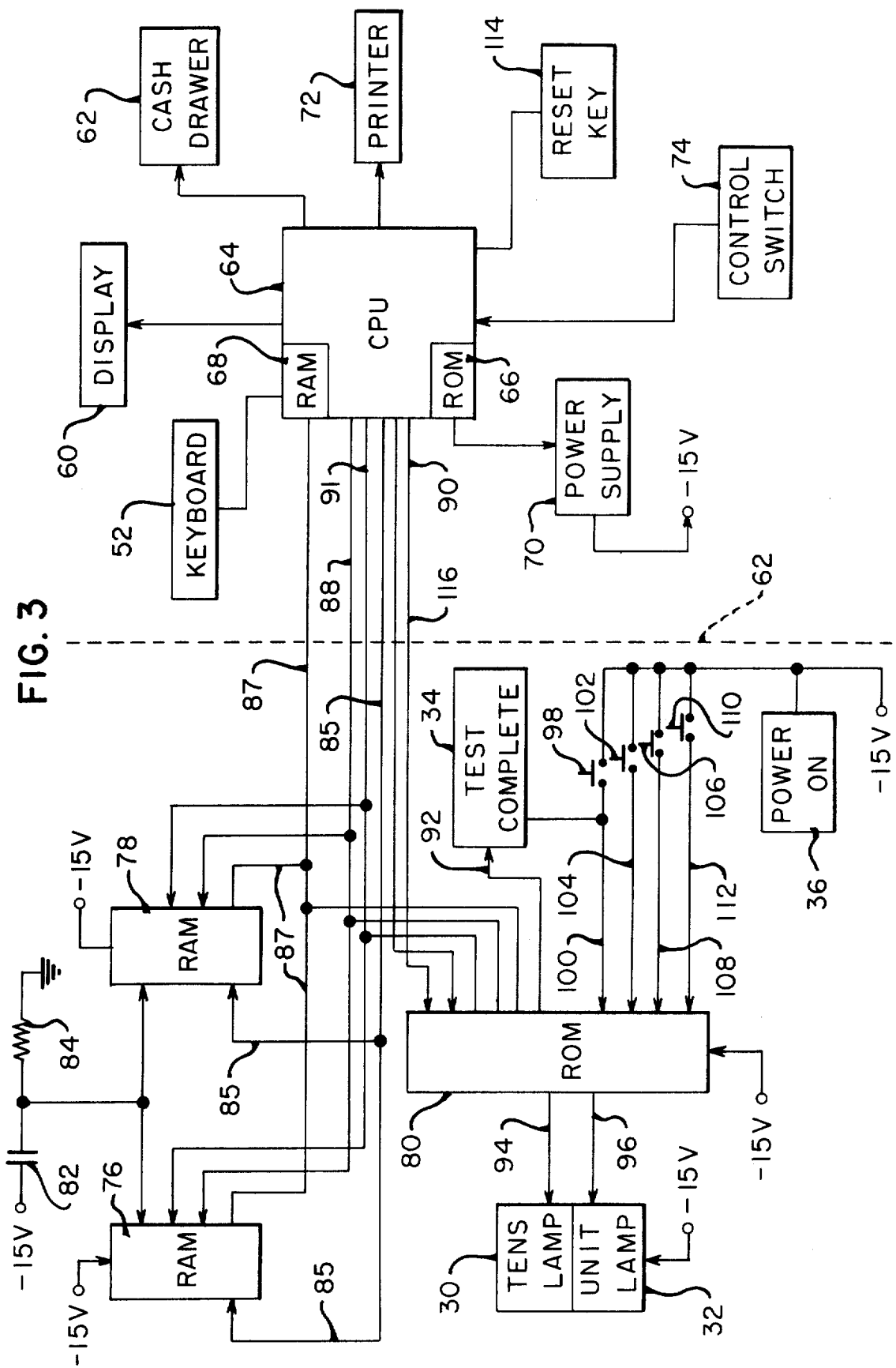
FIG. 3 is a block diagram of the test apparatus and electronic cash register in an attached condition.

Referring now to FIG. 3, there is shown a block diagram of the components of the test apparatus 20 and the ECR 50. In the following description of FIG. 3, the block diagrams represent circuitry that may be constructed with well known principles and data-processing techniques. For example, the usual decode circuits comprise a conventional interconnection of logic elements such as AND, NAND, OR, or NOR gates. When certain conditions exist, the outputs from these gates are applied to still further AND, NAND, OR, or NOR gates to yield an output signal indicating the logical conditions that exist at the input to the decode circuit. Similarly, the operation and construction of RAM's and ROM's are well known in the art. Examples of these elements and circuits for controlling their operation may be found in such standard texts as "Digital Computer Components and Circuits" by R. K. Richards, "Digital Computer Design Fundamentals" by Y. Chu, "Planning a Computer System" by W. Buchholz, "Digital Computer and Control Engineering" by Robert S. Ledley and "Analog and Digital Computer Technology" by R. N. Scott. The main components of the electron-cash register, located to the right of dotted line 62 includes a central processing unit 64 (CPU), and example of which is the Intel MCS-4. The CPU 64 provides the basic control functions for operation of the ECR. It controls and buffers data transferred between input-output units and performs the required arithmetic function. The CPU includes an array of ROM's 66 for storing program data, data tables and instructions and an array of RAM's 68 for storing general data. The CPU 64 also includes an accumulator, input buffer, and an adder/subtractor and associated control logic for sequencing, decoding and data transfers. Although one type of processor is shown, it will be obvious to persons skilled in the art that a general computer may be used to perform the function of the CPU.

Five Input/Output devices are shown in FIG. 3 interfaced with the CPU, they are: the keyboard 52, the display unit 60 and the cash drawer 62 of FIG. 2, a power supply 70, a printer unit 72, control switch 74 and a Reset Key 114. It is obvious that other input/output devices such as change dispensers or rear/side display units may be interfaced with the CPU depending on the application of the electronics cash register.

The diagnostic test apparatus 20 located to the left of dotted line 62 (FIG. 3) includes a pair of RAM's 76, 78 for storing data tranferred from the RAM's 68 in the CPU 64 and a ROM 80 for storing the diagnostic test routines which are to be applied to the ECR under test. After the operator has attached first the ground strap 46 and then the cable 48 from the test apparatus 20 to the ECR 50, the operator will actuate a control switch 74 located within the ECR 50. Actuation of the switch 74 to the ON position transmits a control signal to the CPU 64 which is programmed to turn over the contrl of the CPU to the program stored in the ROM 80 in the test apparatus. Additionally, the control switch 74 will enable the power supply 70 to supply to the test apparatus 20 a −15V voltage to each of the RAM's 76, 78, the ROM 80 and to a RAM reset circuit comprising a 2.2 uf capacitor 82 and a 4.7 k. resistor 84 in series. The voltage developed in this circuit is applied over line 86 to the RAM's 76, 78 thereby resetting each of the RAM's. Power will also be supplied to the Tens lamps 30, Unit lamp 32 and the Power On Lamp 36 on the panel member 26 of the test apparatus 20, the lamp 36 indicating that power has been applied to the RAM's 76, 78 and the ROM 80 of the test apparatus.

As part of the response to the signal from the control switch 74, the CPU will transfer the data in the form of totals stored in the array of RAM's 68 in the CPU 64 over lines 87, to the RAM's 76, 78. This transfer of totals from the CPU 64 to the test apparatus is controlled by a control pulse transmitted over line 85 to the RAM's 76 and 78. In a manner well known in the art, the transfer of the totals utilizes clock pulses transmitted from the CPU over line 88 and sync pulses transmitted over line 91 to the RAM's 76, 78 and the ROM 80 in the test apparatus 20.

The totals that may be generated by operation of the ECR 50 and which may be stored in the RAM's 68 in the CPU 64 include department, void, refund, received on account, tax, charge and other totals which pertain to the carrying out of a business transaction. It is obvious that any loss of these totals during the test operation would seriously affect the usefulness of the ECR. By transferring the totals to the test apparatus 20, the CPU 64 can be tested including the ROM portion 66 and the RAM portion 68 without the danger of destroying the totals in the RAM's 68.

Upon completion of the transfer of the totals to the RAM's 76, 78 in the test apparatus 20, a signal over line 90 from the CPU 64 to the ROM 80 in the test apparatus will result in the ROM 80 transmitting a control pulse over line 92 to turn on the Test Complete lamp 34. Additionally, the ROM 80 will generate control pulses over lines 94, 96 to the tens and unit lamps 30, 32, respectfully, turning off the lamps. This turning on of lamp 34 and the turning off of lamps 30, 32 provides an indication to the operator that the totals have been successfully transferred from the ECR 50 to the test apparatus 20 and that the test apparatus 20 is now in condition to start the test operation.

The application of the diagnostic routines to the ECR 50 (FIG 2) of the present embodiment is controlled by a test program stored in the ROM 80. The program includes a portion of the diagnostic routines being applied automatically to the ECR 50 without operator assistance with the remaining portion requiring that the operator initiate each test routine by depressing the YES key member 42 (FIG. 1) on the front panel member 26 of the test apparatus 20. The results of each test routine is determined by the lighting condition of the Test Complete lamp 34 in a manner to be described hereinafter, allowing the operator to take affirmative action with respect to the elimination of a defective portion of the electronic cash register before proceeding with the next diagnostic routine.

To initiate the test operation, the operator will depress the YES key member 42 (FIG. 1) which closes switch 98 (FIG. 3), thereby transmitting a pulse over line 100 to the ROM 80. Upon receiving this pulse over line 100, the ROM 80 is programmed to transmit the proper control signals over line 90 to the CPU 64 directing the CPU to operate that portion of the electronic cash register in accordance with the control signals received from the ROM 80. In addition, the ROM 80 will transmit the proper control signals over lines 96 to the unit lamps 32 lighting the lamps indicating the number of the test routine being applied to the ECR. If the portion of the cash register being tested is found defective, a control pulse is transmitted over line 85 to ROM 80 from the CPU and from there over line 92 to the Test Complete lamp 45 thereby turning on the lamp 34 indicating that the test is completed and the portion tested is defective.

The operator utilizes a reference manual with the test apparatus 20 listing the type of diagnostic routine that corresponds to the number displayed on the lamps 30 and 32, allowing the operator to know what portion of the electronic cash register that has been found defective. If the diagnostic routine indicates the area of the cash register tested is defective in the manner as described above, the operator can note the defect and by depressing the YES key 42 member (FIG. 1) allows the next diagnostic routine to be initiated. If the operator desires the diagnostic routine to be repeated, depression of the NO key member 44 on the test apparatus 20 will close switch 102 (FIG. 3), thereby transmitting a pulse over line 104 to the ROM 80 resulting in the diagnostic routine being repeated. If the test fails to disclose a defect, the operator can initiate a new test routine by depressing the YES key member 42 in the test apparatus 20 after a predetermined length of time has elapsed since the initiation of the diagnostic routine. Normally each test routine would be completed after a few seconds has elapsed. In that portion of the program which requires the operator to initiate each test routine, the operator, after depressing the YES key member 42, will check the Test Complete lamp 34 to see if it is lighted. If the lamp 34 is not lighted, he can assume the test is successful and thereby initiate a new diagnostic routine by depressing the YES key member 42. If the time element required for the completion of the diagnostic routine is longer than a few seconds, the time interval will be listed in the reference manual.

While there has been described the operation of the test apparatus 20 which requires the operator to initiate each diagnostic routine, the program, as described previously, in the ROM 80 includes the application of the diagnostic routines in a continuous sequence without requiring the operator's assistance, except where a defect is indicated. Thus in checking the ROM's 66 and the RAM's 68 in the CPU 64 of the ECR, the series of test routines are automatically initiated unless a defect is indicated, which as described previously requires the operator to depress the YES key member 42 (FIG. 1) to resume application of the test routines to the ECR.

In the situation where the defect is determined by observation to be in the display or printer area, depression of the Dpexer Key member 40 (FIG. 1) on the test apparatus 20 will close switch 106 (FIG. 3), thereby transmitting a pulse over line 108 to the ROM 80 resulting in the diagnostic routines that normally precede the display-printer test routine being by-passed and the display-printer test routine being applied to the ECR. When all the test routines have been performed and/or disconnection of the test apparatus is desired, the operator will depress the Reload key member 38 (FIG. 1) thereby closing switch 110 (FIG. 3) whereby a pulse is transmitted over line 112 to the ROM 80 resulting in the totals stored in the RAM's 76, 78 being transferred over lines 87 to the RAM's 68 in the CPU. If the transfer of the totals is successful, the CPU will disable the power supply 70 resulting in all of the lamps on the front panel member 26 of the test apparatus going off.

If the transfer did not succeed, the lamps on the test apparatus will remain on. The transfer of the totals can be again attempted by depressing the Reload key member 38. If this procedure fails, the test operation can be terminated by depressing a Reset key member 114 (FIG. 3) on the keyboard 52 of the ECR 50 which results in the CPU 64 transmitting a control pulse over line 116 to the ROM 80 thereby preventing power from entering the ROM 80 and the RAM's 76, 78 on the test apparatus. As part of this procedure, the power will also be disconnected from both the ECR and the test apparatus allowing the test apparatus 20 to be disconnected from the ECR. The control switch 74 on the ECR is now returned to its OFF position conditioning the ECR for operation.

Figure 4A:
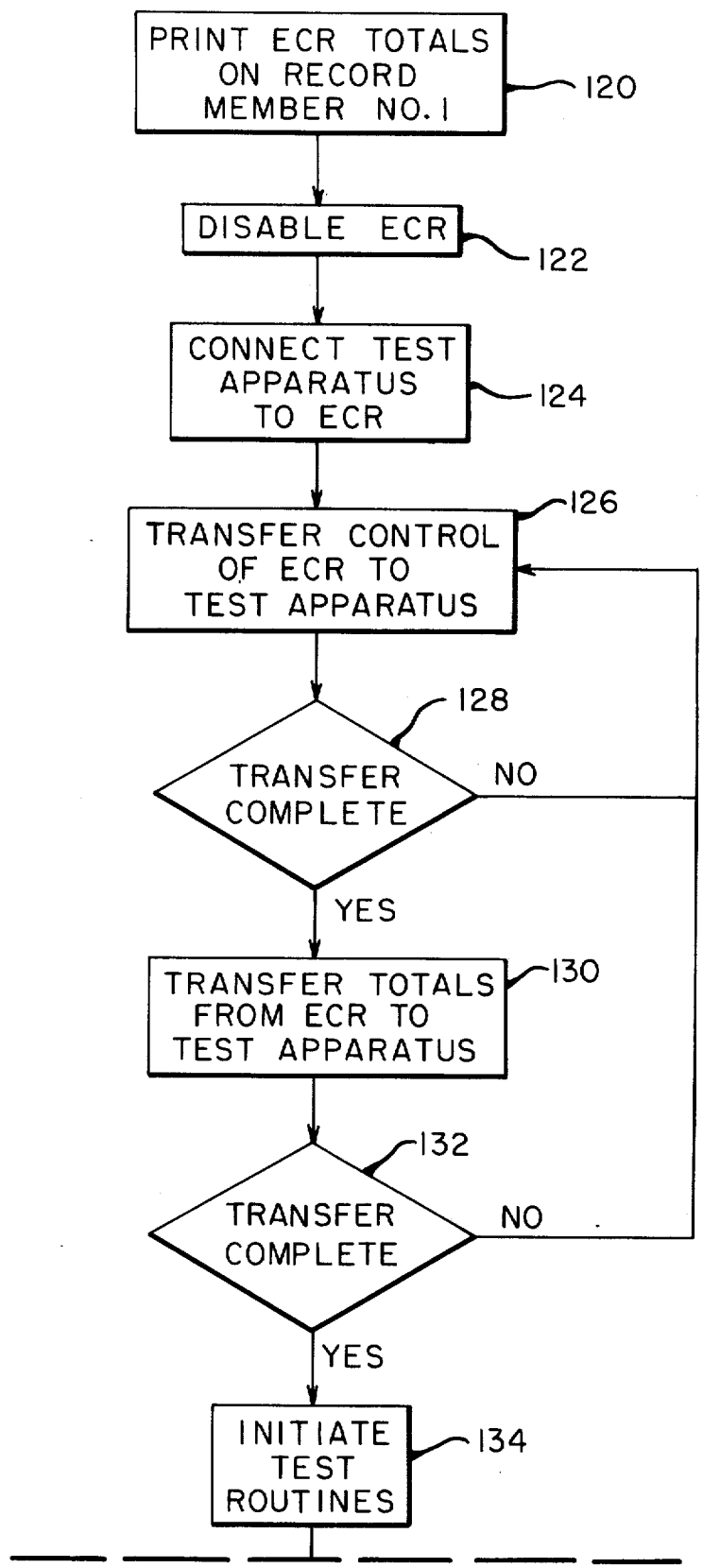
FIGS. 4A and 4B illustrate in flow diagram form the preferred invention.
Figure 4B:
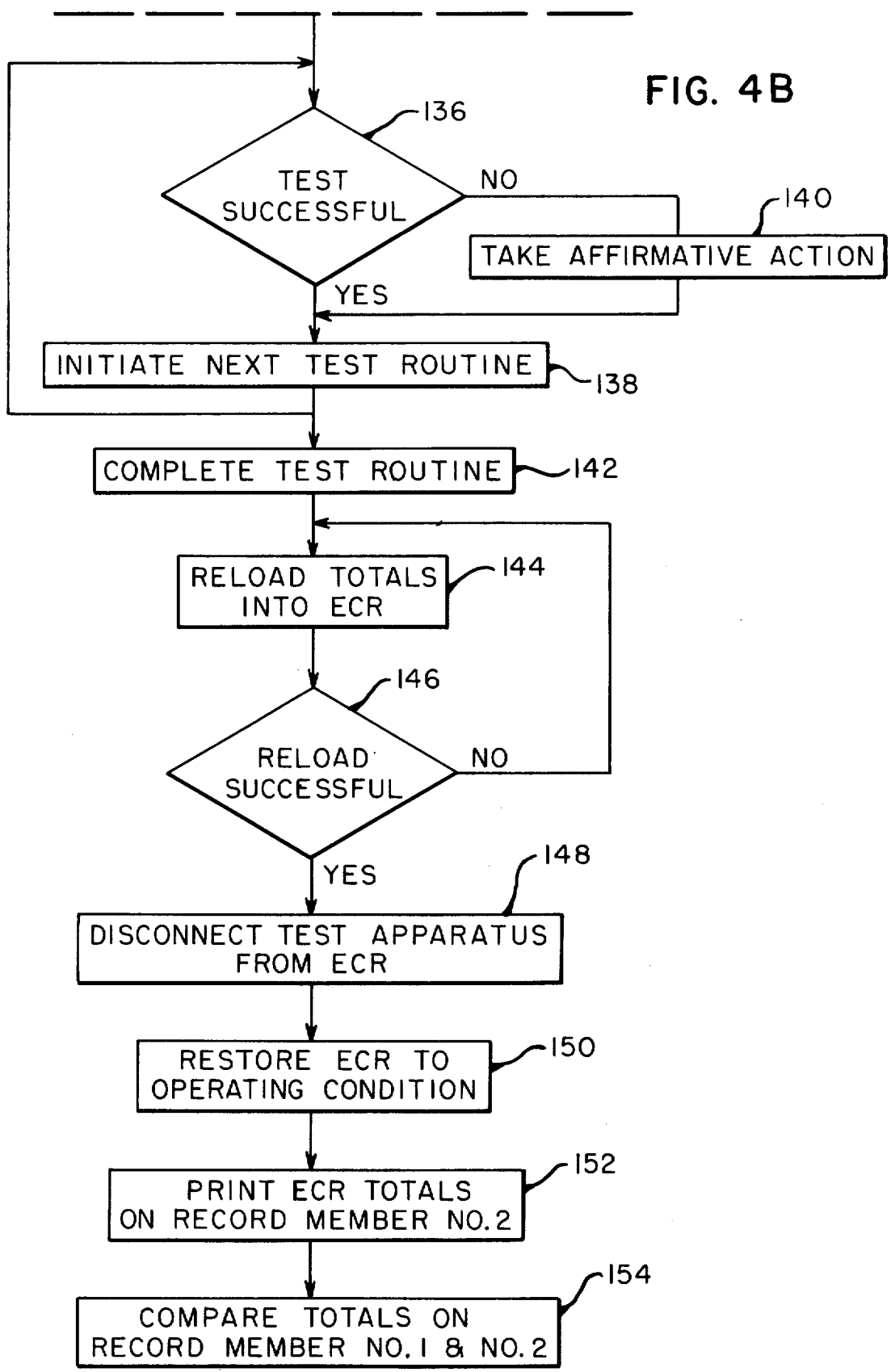

Referring now to the flow chart of FIGS. 4A and 4B, the operating sequence of the preferred embodiment of the invention is shown therein. Upon entering a test procedure, the operator operates the ECR (step 120) by actuating the Control key 58 (FIG. 2) to print out on a first record member all of the totals that are stored in the RAM's 68 of the CPU 64. After removing the record member from the ECR, the operator disables the ECR (step 122) by positioning the control switch 74 in the ON position. The sequence is advanced to step 124 wherein the cable 48 (FIG. 1) is attached to the ECR 50 (FIG. 2). Upon attaching the cable 48 to the ECR, the control switch 74 (FIG. 3) is toggled between the "ON" and "OFF" position signaling the CPU 64 to transfer (step 126) control of the ECR 50 to the test apparatus 20. If the transfer is successful (step 128), the Power On lamp 36 and the Test Phase Number lamps 30, 32 will be illuminated while the Test Complete lamp 34 will be off. If the lamps 30, 32 and 36 fail to light, the switch 74 is again toggled until the transfer is attained.

After the control of the ECR has been transferred to the Test apparatus 20, the totals stored in the ECR are transferred to the Test apparatus 20 (step 130). If the transfer is successful, the Test Complete lamp 34 will be turned on (step 132) and the Test Phase Number lamps 30 and 32 will be turned off. If the transfer of the totals to the Test apparatus 20 fails to occur, repeat of step 126 is required until the transfer of the totals is accomplished.

Upon the transfer of the totals to the test apparatus, the operator will initiate the test program (step 134) by depressing the YES key member 42 (FIG. 1) on the test apparatus 20. If the first diagnostic routine is successful in that no defect is discovered (step 136), the Test Commplete lamp 34 will not light. After a predetermined length of time has elapsed signaling that the test or diagnostic routine has been completed, the operator will initate the next test routine (step 136) by again depressing the YES key member 42 and determining whether the test is successful (step 136) by observing the condition of the Test Complete lamp 34.

If the Test Complete lamp 34 does light indicating a defect has been discovered, the operator will take affirmative action (step 140) which may include noting the fault or correcting the fault, after which he will continue with the test program by initiating the next test or diagnostic routine (step 138). This procedure will continue until all the required test routines are completed (step 142). After the completion of the last test routine, the totals stored in the test apparatus 20 are restored in the ECR (step 144) by depressing the Reload key member 38 (FIG. 1) on the Test apparatus 20. The operator then determines if the reloading of the totals was successful (step 146) by observing a predetermined number in the Test Phase Number lamps 30, 32 and in the lighting of the Test Complete lamp 34. If the reloading of the totals is successful, the operator disconnects (step 148) the Test apparatus 20 from the ECR 50 by removing the cable 48 from the ECR and restoring the ECR to operating condition (step 150) by positioning the control switch 74 in the "OFF" position.

If the reloading of the totals in the ECR was not successful, the operator will again attempt to reload the totals by depressing the Reload key member 38 (step 144) until the transfer is accomplished. The operator then operates the ECR to print out the totals stored in the ECR on a second record member by depressing the Control key member 58 (FIG. 2) (step 152). The operator then compares the totals printed on the first and second record members (step 154) insuring that the totals now stored in the ECR are the same as the totals stored in the ECR are the same as the totals stored in the ECR prior to the testing of the ECR.

While the principals of the invention have now been made clear in an illustrated embodiment, it will be obvious to those skilled in the art that such invention may be used with any and all data processing equipment and that many modifications of structure, arrangements, elements and components can be made which are particularly adapted for specific environments and operating requirements without departing from those principals. Thus, it is obvious that the Test Complete lamp 34 can be wired not to light whenever a fault has been detected by the diagnostic routine applied to the data processing apparatus. In addition, other means can be employed to indicate the result of the application of the diagnostic routine to the data processing apparatus such as an audible tone being generated whenever a fault is either discovered or not discovered. The appended claims are therefore intended to cover and embrace any such modifications, within the limits only of the true spirit and scope of the invention.

What is claimed is:
1. A method of utilizing a test apparatus with a data processing apparatus having stored data therein, said data processing apparatus including means for recording on a record member the data stored in the apparatus, the method comprising the steps of:
   a. generating a first record of the data stored in the data processing apparatus;
   b. transferring the stored data from the data processing apparatus to the test apparatus;
   c. conditioning the data processing apparatus for operation in a test mode;
   d. transferring the stored data from the test apparatus to the data processing apparatus;
   e. generating a second record of the data stored in the data processing apparatus;
   f. and comparing the data on the said first and second records.

2. A method of utilizing a test apparatus with a data processing apparatus having stored data therein, said data processing apparatus including means for printing the data stored in the data processing apparatus, the method comprising the steps of:
   a. printing on a first record member the data stored in the data processing apparatus;
   b. attaching said test apparatus to the data processing apparatus;
   c. transferring the stored data from the data processing apparatus to the test apparatus;
   d. conditioning the data processing apparatus for operation in a test mode;
   e. transferring the stored data from the test apparatus to the data processing apparatus;
   f. printing on a second record member the data stored in the data processing apparatus;
   g. and comparing the data printed on the first and second record members.

3. A method of utilizing a test apparatus with a data processing apparatus having stored data therein comprising the steps of:
   a. attaching said test apparatus to the data processing apparatus;
   b. transferring the stored data from the data processing apparatus to the test apparatus;
   c. conditioning the data processing apparatus for operation in a test mode;
   d. transferring the stored data from the test apparatus to the data processing apparatus;
   e. and removing the test apparatus from the data processing apparatus.

4. For use with a data processing apparatus having data stored therein, a test apparatus comprising:
   a. means for connecting the test apparatus to the data processing apparatus;
   b. data storage means;
   c. a first manually operative control member for initiating a transfer of data from the data processing apparatus to the data storage means over said connecting means;
   d. a second manually operative control member for conditioning the data processing apparatus for operation in a test mode;
   e. and a third manually operative control member for initiating a transfer of data from the data storage means to the data processing apparatus.

5. The test apparatus of claim 4 further comprising circuit means for clearing data from said data storage means upon connecting the test apparatus to the data processing apparatus.

6. A test apparatus for use with a data processing apparatus having data stored therein comprising:
   a. a keyboard assembly;
   b. means mounted on said keyboard assembly for interconnecting said keyboard assembly and the data processing apparatus over which data representing signals may be transmitted;

c. storage means mounted on said keyboard assembly for storing data received from the data processing apparatus over said interconnecting means;
d. a first manually operative switch member mounted on said keyboard assembly for intiating the transfer of data from the data processing apparatus to the storage means over said interconnecting means;
e. a second manually operative switch member mounted on said keyboard assembly for operating the data processing apparatus in a test mode;
f. and a third manually operative switch member mounted on said keyboard assembly for initiating the transfer of data from the data storage means to the data processing apparatus.

* * * * *